United States Patent
Wang

(10) Patent No.: US 10,371,793 B2
(45) Date of Patent: Aug. 6, 2019

(54) TRANSMISSION OF WEATHER RADAR DATA

(71) Applicant: Honeywell International Inc., Morris Plains, NJ (US)

(72) Inventor: Haiming Wang, Beijing (CN)

(73) Assignee: Honeywell International Inc., Morris Plains, NJ (US)

( * ) Notice: Subject to any disclaimer, the term of this patent is extended or adjusted under 35 U.S.C. 154(b) by 256 days.

(21) Appl. No.: 15/231,473

(22) Filed: Aug. 8, 2016

(65) Prior Publication Data

US 2018/0038941 A1 Feb. 8, 2018

(51) Int. Cl.
*G01S 7/00* (2006.01)
*G01S 13/95* (2006.01)

(52) U.S. Cl.
CPC ............ *G01S 7/003* (2013.01); *G01S 13/953* (2013.01); *Y02A 90/18* (2018.01)

(58) Field of Classification Search
CPC ........ G01S 7/003; G01S 13/95; G01S 13/951; G01S 13/955; G01S 13/953; G01S 13/956; G01S 13/958
See application file for complete search history.

(56) References Cited

U.S. PATENT DOCUMENTS

| | | | | |
|---|---|---|---|---|
| 7,039,505 B1 * | 5/2006 | Southard | ................. | G01S 7/003 701/3 |
| 7,307,577 B1 * | 12/2007 | Kronfeld | ................. | G01S 7/411 342/26 B |
| 7,365,673 B2 * | 4/2008 | Makkapati | .............. | G01S 7/003 342/26 R |
| 7,486,220 B1 * | 2/2009 | Kronfeld | ................ | G01S 13/953 342/26 B |
| 8,159,369 B1 * | 4/2012 | Koenigs | .................. | G01S 7/062 340/963 |
| 8,223,062 B2 * | 7/2012 | Bunch | ................ | H04B 7/18506 342/26 B |

(Continued)

FOREIGN PATENT DOCUMENTS

EP 2096458 A2 9/2009
EP 2256957 A2 12/2010

OTHER PUBLICATIONS

"WXR-2100 MultiScan ThreatTrack™ weather radar," Rockwell Collins, retrieved from https://www.rockwellcollins.com/~media/Files/Unsecure/Products/Product%20Brochures/Radar%20and%20Surveillance/Weather%20Radar/WXR-2100/WXR-2100%20MultiScan%20ThreatTrack.aspx on Aug. 8, 2016, 2 pp.

(Continued)

*Primary Examiner* — Peter M Bythrow
(74) *Attorney, Agent, or Firm* — Shumaker & Sieffert, P.A.

(57) ABSTRACT

A method of processing weather data is described that includes receiving, in a vehicle and from a detection system, reflectivity data sampled for a three-dimensional volume of space. The method further includes generating, based on the reflectivity data, a plurality of two-dimensional representations of the reflectivity data. The method further includes transmitting, by a transmission device to a base receiver, a subset of the plurality of two-dimensional representations, wherein each two-dimensional representation of the subset of the plurality of two-dimensional representations comprises a plurality of data points.

20 Claims, 7 Drawing Sheets

(56) References Cited

U.S. PATENT DOCUMENTS

| | | | | |
|---|---|---|---|---|
| 8,395,541 | B2* | 3/2013 | Khatwa | G01S 7/22 342/26 B |
| 8,742,974 | B1* | 6/2014 | Sishtla | G01S 13/953 342/182 |
| 8,847,794 | B2* | 9/2014 | Buratto | G08G 5/0091 340/971 |
| 8,994,578 | B1* | 3/2015 | Finley | G01S 13/953 342/26 B |
| 9,000,972 | B1* | 4/2015 | Cahoon | G01S 13/95 342/26 B |
| 9,019,146 | B1* | 4/2015 | Finley | G01S 13/95 342/26 B |
| 9,057,773 | B1* | 6/2015 | Fersdahl | G01S 13/953 |
| 9,223,020 | B1* | 12/2015 | Crosmer | G01S 13/951 |
| 9,244,157 | B1* | 1/2016 | Sishtla | G01S 7/062 |
| 9,244,167 | B1* | 1/2016 | Oransky | G01S 13/953 |
| 9,384,586 | B1* | 7/2016 | McCusker | G08G 5/0021 |
| 9,395,438 | B1* | 7/2016 | Woodell | G01S 7/04 |
| 9,411,044 | B1* | 8/2016 | Sperling | G01S 7/22 |
| 9,418,562 | B2* | 8/2016 | Frolik | B64D 45/00 |
| 9,710,218 | B2* | 7/2017 | Khatwa | G06F 3/147 |
| 9,810,770 | B1* | 11/2017 | Weichbrod | G01S 13/953 |
| 9,823,347 | B1* | 11/2017 | Koenigs | G01S 13/953 |
| 9,864,055 | B1* | 1/2018 | Sishtla | G01S 13/953 |
| 9,869,766 | B1* | 1/2018 | Breiholz | G01S 13/95 |
| 10,037,124 | B2* | 7/2018 | Khatwa | G06F 3/04817 |
| 2009/0219196 | A1* | 9/2009 | Bunch | G01S 7/003 342/176 |
| 2010/0245167 | A1* | 9/2010 | Bunch | G01S 7/003 342/26 B |
| 2010/0302093 | A1* | 12/2010 | Bunch | H04B 7/18506 342/26 B |
| 2011/0074624 | A1* | 3/2011 | Bunch | G01S 7/003 342/26 D |
| 2017/0082745 | A1* | 3/2017 | Kronfeld | G01S 13/953 |

OTHER PUBLICATIONS

"IntuVue™ 3-D Weather Hazard and Avoidance System," Honeywell Aerospace, retrieved from https://aerospace.honeywell.com/en/~/media/aerospace/files/brochures/c61-1531-000-000-intuvue-3d-weather-hazard-and-avoidance-system-bro.pdf on Aug. 8, 2016, 3 pp.

Response to Extended European Search Report dated Dec. 6, 2018, from counterpart European Patent Application No. 17181324.9, filed on Mar. 28, 2018, 13 pp.

Extended European Search Report from counterpart European Patent Application No. 17181324.9, dated Dec. 6, 2017, 7 pp.

Examination Report from counterpart European Application No. 17181324.9, dated Feb. 21, 2019, 4 pp.

Response to Examination Report dated Feb. 21, 2019, from counterpart European Application No. 17181324.9, filed May 29, 2019, 10 pp.

* cited by examiner

TRANSMISSION OF WEATHER RADAR DATA

TECHNICAL FIELD

This disclosure relates to weather radar systems.

BACKGROUND

A vehicle such as an aircraft may use an onboard weather radar system to detect adverse weather conditions, which may enable the flight crew to make changes to the flight plan as necessary to avoid potentially hazardous weather. Weather information collected by an aircraft may also be transmitted to a base station where the base station may combine the aircraft-collected weather information with weather information from other sources in order to perform weather analysis. An aircraft in flight may also receive weather information from base stations. Up-to-date weather information may assist the flight crew and others in evaluating whether or how to modify a flight plan to ensure safety of the flight.

SUMMARY

This disclosure is directed to systems, devices, and methods for processing weather data before transmitting the weather data to a base receiver. A processor on a vehicle may compress weather data for a three-dimensional volume of space into a plurality of two-dimensional representations to reduce the size of the data transmission. A transmission device may then transmit the two-dimensional representations to a base receiver.

In one example, a method of processing weather data includes receiving, in a vehicle and from a detection system, reflectivity data sampled for a three-dimensional volume of space. The method further includes generating, based on the reflectivity data, a plurality of two-dimensional representations of the reflectivity data. The method further includes transmitting, by a transmission device to a base receiver, a subset of the plurality of two-dimensional representations, wherein each two-dimensional representation of the subset of the plurality of two-dimensional representations comprises a plurality of data points.

In another example, a system for processing weather data comprises a detection system configured to receive reflectivity data sampled for a three-dimensional volume of space and a processor configured to receive the reflectivity data from the detection system and generate, based on the reflectivity data, a plurality of two-dimensional representations of the reflectivity data. The system further comprises a transmission device configured to transmit a subset of the plurality of two-dimensional representations to a base receiver, wherein each two-dimensional representation of the subset of the plurality of two-dimensional representations comprises a plurality of data points.

Another example is directed to a device that includes a computer-readable medium having executable instructions stored thereon that is configured to be executable by one or more processors for causing the one or more processors to receive, in a vehicle and from a detection system, reflectivity data sampled for a three-dimensional volume of space, generate, based on the reflectivity data, a plurality of two-dimensional representations of the reflectivity data. The executable instructions further cause the one or more processors to transmit, by a transmission device to a base receiver, a subset of the plurality of two-dimensional representations, wherein each two-dimensional representation of the subset of the plurality of two-dimensional representations comprises a plurality of data points.

The details of one or more examples are set forth in the accompanying drawings and the description below. Other features, objects, and advantages will be apparent from the description and drawings, and from the claims.

DETAILED DESCRIPTION

This disclosure is directed to systems, devices, and methods for processing weather data before transmitting the weather data to a base receiver. A processor on a vehicle may compress weather data for a three-dimensional volume of space into a plurality of two-dimensional representations to reduce the size of the data transmission. A transmission device may then transmit the two-dimensional representations to a base receiver.

Figure 1:
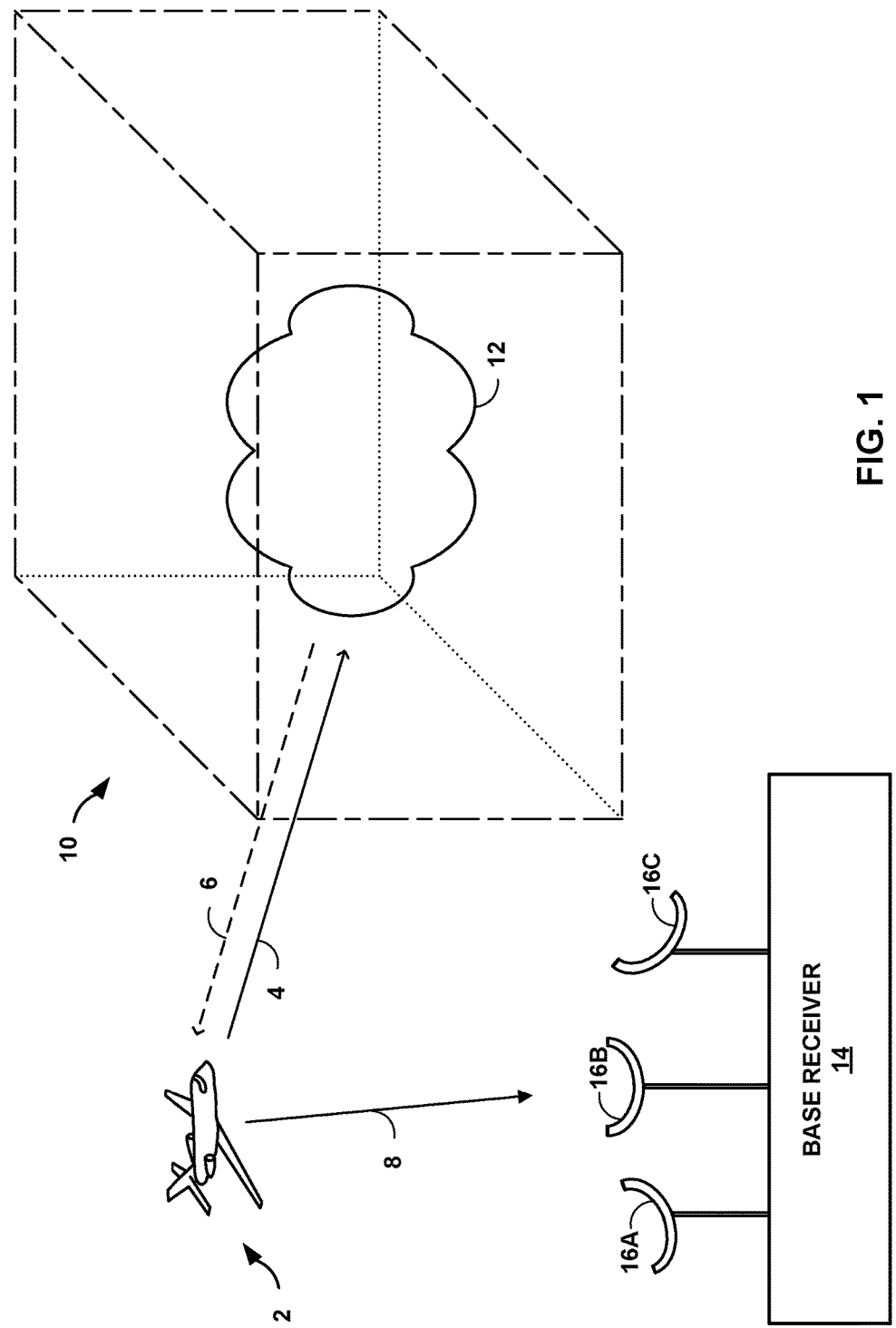
FIG. 1 illustrates a vehicle collecting and transmitting weather radar data to a base receiver, in accordance with some examples of this disclosure.

FIG. 1 illustrates a vehicle 2 collecting and transmitting weather radar data to a base receiver 14, in accordance with some examples of this disclosure. FIG. 1 depicts vehicle 2 as an airplane, but vehicle 2 may be any mobile object or remote object that receives reflectivity data for a three-dimensional volume of space such as volume 10. Vehicle 2 may be an aircraft such as a helicopter or a weather balloon. Vehicle 2 may also be a land vehicle such as an automobile or a water vehicle such as a ship or a submarine.

Vehicle 2 may transmit and receive signals to collect weather data from volume 10, where volume 10 represents a three-dimensional area of space that is within range of a weather radar of vehicle 2. In the example of FIG. 1, volume 10 includes cloud 12. Cloud 12 may reflect transmitted signal 4 as return signal 6, and a weather radar of vehicle 2 may receive return signal 6. Return signal 6 may comprise a return echo from a target such as cloud 12, a water droplet, a particle, or a molecule within volume 10. Vehicle 2 may process return signals 6 to determine the reflectivity for multiple data points within volume 10. In some examples, vehicle 2 may be inside of or outside of volume 10.

Processing circuitry (e.g., a processor, not explicitly shown in FIG. 1) on vehicle 2 may process and analyze reflectivity data using location data for vehicle 2, including latitude, longitude, and altitude data. The processor may also receive course data for vehicle 2, including direction, trajectory, and roll. The processor may use location data, course data, and return signals 6 to determine the reflectivity data for multiple data points within volume 10. Reflectivity data may include "weather data" and/or data relating to the moisture or particles in a volume of space.

Vehicle 2 may include systems and devices for detecting the reflectivity of locations within volume 10. The systems and devices within vehicle 2 may process the reflectivity data into a three-dimensional representation or array. After processing the reflectivity data, vehicle 2 may transmit data signal 8 to base receiver 14, which may include receivers 16A-16C. Receivers 16 may comprise antennas or satellite dishes. The systems and devices within vehicle 2 may transmit reflectivity data to base receiver 14 via Aircraft Communications Addressing and Reporting System (ACARS) using a protocol standard such as Aeronautical Radio, Incorporated (ARINC), seven-hundred series.

In accordance with the techniques of this disclosure, a processor on vehicle 2 may receive reflectivity data for a three-dimensional volume of space and generate a plurality of two-dimensional representations of the reflectivity data. Vehicle 2 may transmit a subset of the plurality of two-dimensional representations to base receiver 14. By transmitting a subset of two-dimensional representations, a device or system implementing the techniques of this disclosure may transmit weather information in a smaller amount of data in order to reduce the amount of data transmitted. A device or system implementing the techniques of this disclosure may select the number and orientation of two-dimensional representations based on the magnitude or severity of the reflectivity data.

Compared to generating one horizontal two-dimensional representation with no vertical information, the techniques of the disclosure offer a good balance between data accuracy and resource consumption. Transmitting all of the three-dimensional representation to base receiver 14 may lead to heavy resource consumption. To reduce the volume of weather data for transmission, while maintaining the accuracy of the data transmission, vehicle 2 may compress the three-dimensional representation to a plurality of two-dimensional representations or to one or more index planes that contain orthogonal layer values. Each index plane may be a two-dimensional representation or array comprising data points that each hold zero or more orthogonal layer values.

Figure 2:
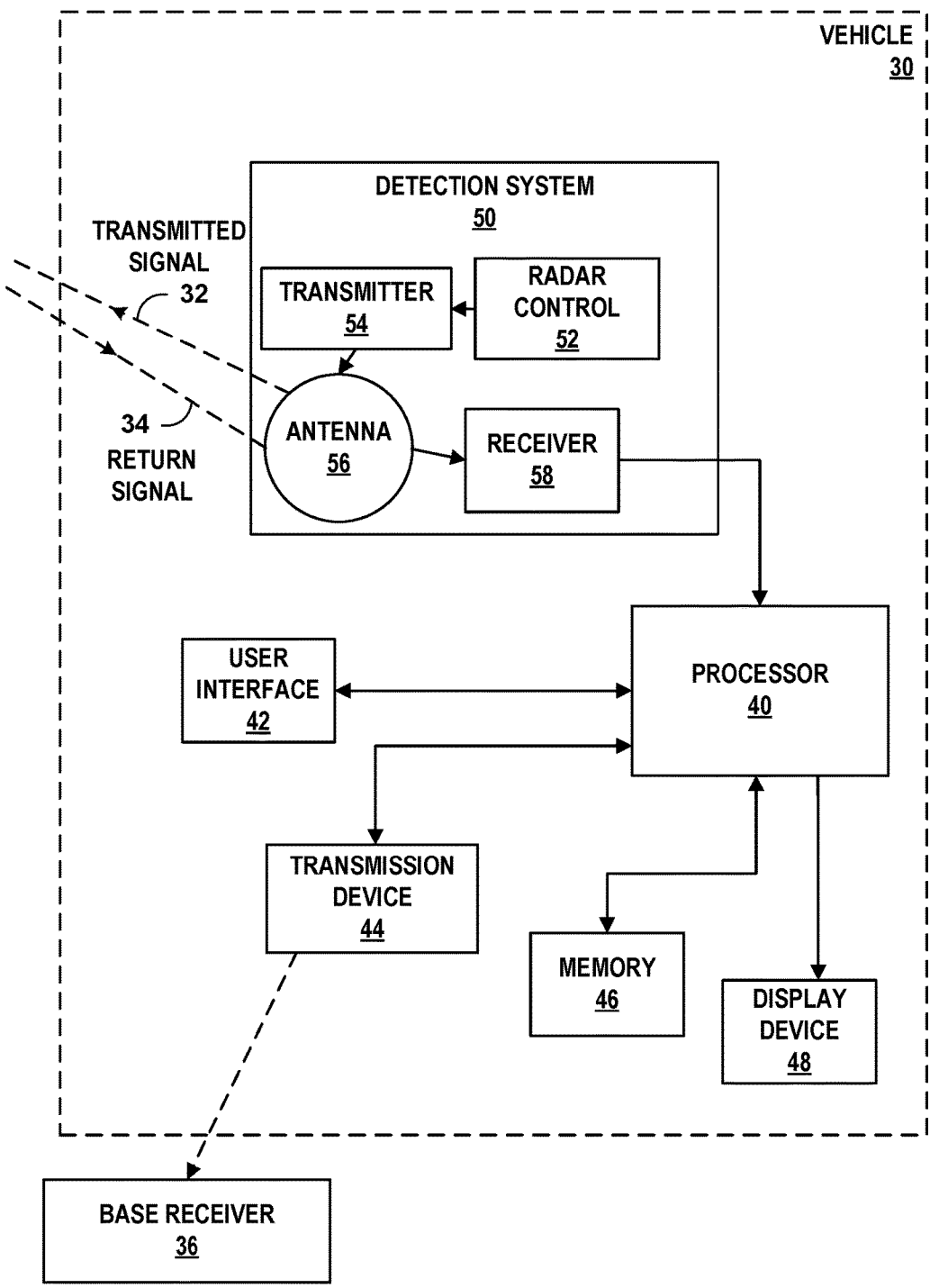
FIG. 2 is a conceptual block diagram of a detection system and a processor in a vehicle for collecting and transmitting weather radar data to a base receiver, in accordance with some examples of this disclosure.

FIG. 2 is a conceptual block diagram of a detection system 50 and a processor 40 in a vehicle 30 for collecting and transmitting weather radar data to a base receiver 36, in accordance with some examples of this disclosure. In the example of FIG. 2, vehicle 30 includes detection system 50, processor 40, user interface 42, transmission device 44, memory 46, and display device 48. Processor 40 is communicatively coupled to detection system 50, user interface 42, transmission device 44, memory 46, and display device 48. In some examples, vehicle 30 may correspond to vehicle 2 as described in FIG. 1. Additionally, for ease of understanding, detection system 50 has been described separate from processor 40, however, processor 40 and/or other processor(s) may be included in detection system 50 or may control any portion of detection system 50.

Detection system 50 may comprise transmitter 54 and receiver 58 connected to antenna 56. Radar control 52 may control the intensity and direction of transmitted signals 52 that are emitted by antenna 56. Detection system 50 includes any number of processors (not shown) required to perform the functions attributed to detection system 50. Radar control 52 controls transmitter 54 to transmit transmitted signal 32 that includes a waveform and a plurality of coherent pulses. Radar control 52 also controls receiver 58 to receive return signal 34 via antenna 56.

Detection system 50 receives return signal 34 from the scattering of transmitted signal 32 from the external environment including weather and terrain, which is delivered to and outputted by receiver 58 in a range bin to processor 40. In some examples, processor 40 may receive return signal 34 in a range bin and determine the signal power measurement of return signal 34 based on the waveform of return signal 34. In some examples, processor 40 may receive return signal 34 in the range bin and determine Doppler spectral information based on the plurality of coherent pulses. In some examples, processor 40 may process the power signal measurement to estimate reflectivity values for ground and/or weather elements. In other examples, processor 40 may process the Doppler spectral information to estimate a signal power. In these examples, processor 40 may process the first signal power measurement to estimate reflectivity values for ground and/or weather elements.

Processor 40 may receive reflectivity data sampled for a three-dimensional volume of space from receiver 58 and generate a plurality of two-dimensional representations. Processor 40 may update estimates of weather reflectivity and ground normalized radar cross section contained in memory 46 (e.g., three-dimensional volumetric buffer) with the estimated reflectivity values. Processor 40 may generate an image for presentation on display device 48 based on data stored in the three-dimensional volumetric buffer in memory 46. Processor 40 may cause user interface 42 to generate an alert based on the reflectivity data or cause display device 48 to display one or more two-dimensional representations.

Transmission device 44 may be configured to transmit reflectivity data to base receiver 36. The rate at which detection system 50 collects reflectivity data may exceed the throughput of the transmission link between transmission device 44 in vehicle 30 and base receiver 36. As a result, processor 40 may cause transmission device 44 to transmit a subset of the two-dimensional representations to base receiver 36. Processor 40 may select the subset based on a variety of factors, including the severity of weather conditions, as indicated by the reflectivity data. Processor 40 may select a single two-dimensional representation or multiple two-dimensional representations for transmission to base receiver 36.

In some examples, each two-dimensional representation may include an index plane with orthogonal layer values indicating that a reflectivity data value in a respective orthogonal layer exceeds a threshold value. The threshold value may be a reflectivity data value that defines an approximate cutoff between clear weather conditions at lower reflectivity values and inclement weather conditions at higher reflectivity values. For a horizontal index plane, each data point may comprise a latitude range and a longitude range, and each orthogonal layer may comprise a vertical layer comprising an altitude range. The data points on a horizontal index plane, i.e., a two-dimensional representation, may comprise orthogonal layer values indicating the altitude ranges at which the reflectivity data exceeds a threshold range.

Figure 3:
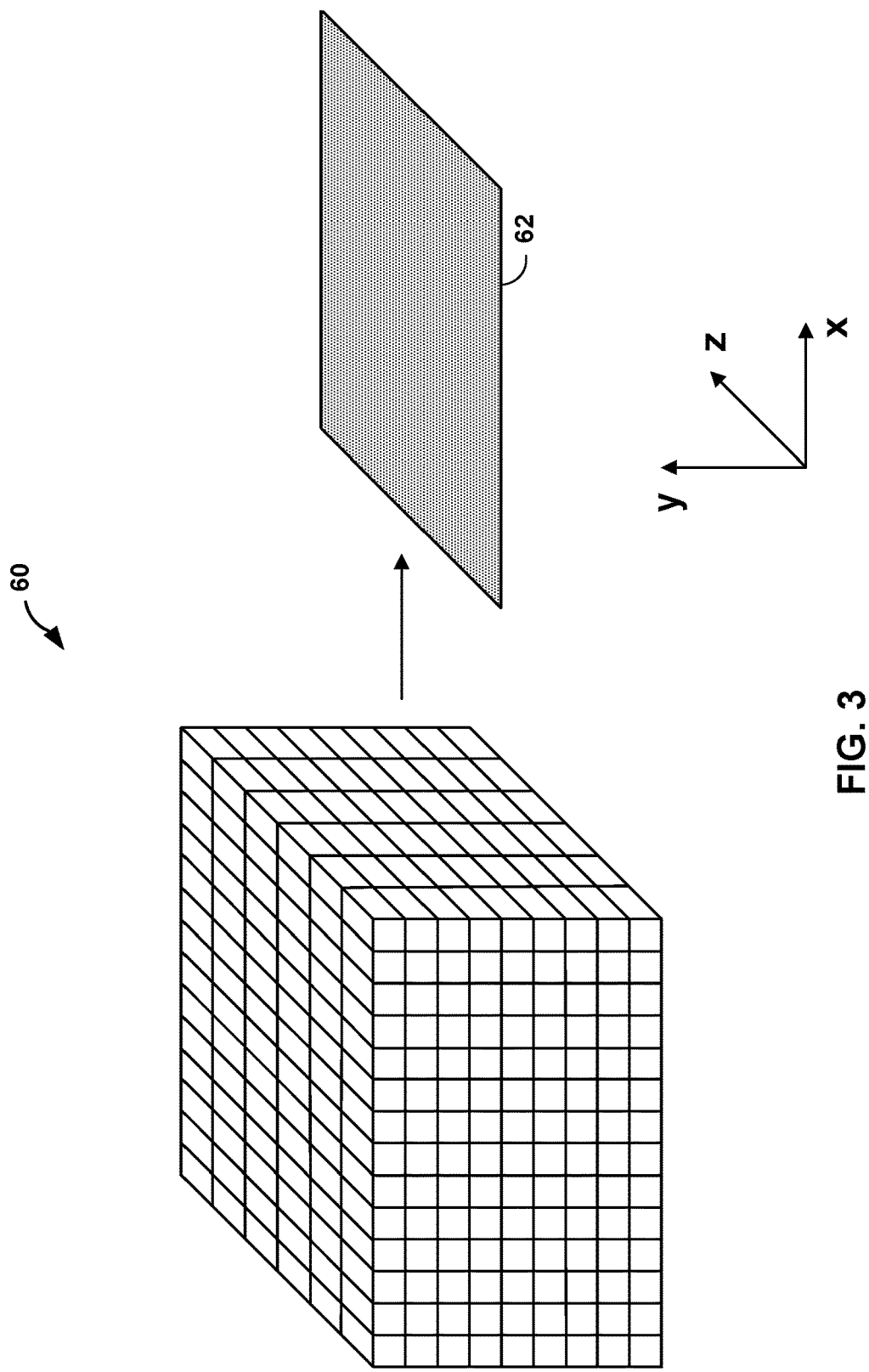
FIG. 3 is a conceptual block diagram depicting the conversion of a three-dimensional representation into a single two-dimensional representation, in accordance with some examples of this disclosure.

FIG. 3 is a conceptual block diagram depicting the conversion of a three-dimensional representation 60 into a single two-dimensional representation 62, in accordance with some examples of this disclosure. Three-dimensional representation 60 may include a plurality of data points arrayed in three dimensions, where each data point represents a location within the three-dimensional volume of space. In some examples, each data point in three-dimensional representation 60 may have a latitude range, a longitude range, and an altitude range.

In some examples, three-dimensional representation 60 may comprise data points with an X value, a Y value, a Z value, and a reflectivity data value. The X value may represent longitude, the Y value may represent altitude, and the Z value may represent latitude three-dimensional representation 60 may be stored as a database or array in memory, such as memory 46 in FIG. 2. The reflectivity data value for each data point may represent the intensity of the return signal from the location associated with the data point. A relatively high reflectivity data value may indicate a higher density of water vapor or liquid water. Thus, a relatively high reflectivity data point may indicate clouds or precipitation. A processor may determine the severity of the weather at a given location by analyzing the reflectivity data received from the location. A relatively low reflectivity data may indicate less severe weather or fewer clouds and precipitation.

A processor may create two-dimensional representation 62 to represent the reflectivity data in three-dimensional representation 60 using fewer bits of data. The processor may use a variety of techniques to create two-dimensional representation 62 from three-dimensional representation 60. Two-dimensional representation 62 may be a horizontal layer, where each data point on two-dimensional representation 62 represents a latitude range and a longitude range. Two-dimensional representation 62 may also be a vertical layer, where each data point on two-dimensional representation 62 represents an altitude range and a latitude range or a longitude range.

The processor may use a variety of techniques to select the reflectivity data for the data points in two-dimensional representation 62. In some examples, each data point in two-dimensional representation 62 may include a reflectivity data value at a specific altitude or altitude range. In examples where two-dimensional representation 62 is a vertical layer, the reflectivity data value may correspond to a specific latitude or longitude or ranges of latitudes or longitudes. In some examples where two-dimensional representation 62 is a horizontal layer, the reflectivity data value of a data point may be the highest reflectivity data value for any altitude within the latitude range and the longitude range of the data point. Thus, two-dimensional representation 62 may contain some but not all of the reflectivity data from three-dimensional representation 60. For example, Table I depicts a hypothetical data set for three-dimensional representation 60, including an X value, a Y value, a Z value, and a reflectivity data value (RDV) for each data point.

TABLE I

An example of three-dimensional representation 60

| X | Y | Z | RDV |
|---|---|---|-----|
| 0 | 0 | 0 | 4 |
| 0 | 0 | 1 | 1 |

TABLE I-continued

An example of three-dimensional representation 60

| X | Y | Z | RDV |
|---|---|---|-----|
| 0 | 0 | 2 | 0 |
| 0 | 0 | 3 | 2 |
| 1 | 0 | 0 | 9 |
| 1 | 0 | 1 | 1 |
| 1 | 0 | 2 | 7 |
| 1 | 0 | 3 | 6 |
| 2 | 0 | 0 | 0 |
| 2 | 0 | 1 | 2 |
| 2 | 0 | 2 | 1 |
| 2 | 0 | 3 | 0 |
| 3 | 0 | 0 | 3 |
| 3 | 0 | 1 | 2 |
| 3 | 0 | 2 | 1 |
| 3 | 0 | 3 | 3 |
| 0 | 1 | 0 | 0 |
| 0 | 1 | 1 | 5 |
| 0 | 1 | 2 | 3 |
| 0 | 1 | 3 | 0 |
| 1 | 1 | 0 | 1 |
| 1 | 1 | 1 | 4 |
| 1 | 1 | 2 | 1 |
| 1 | 1 | 3 | 2 |
| 2 | 1 | 0 | 0 |
| 2 | 1 | 1 | 0 |
| 2 | 1 | 2 | 3 |
| 2 | 1 | 3 | 2 |
| 3 | 1 | 0 | 2 |
| 3 | 1 | 1 | 1 |
| 3 | 1 | 2 | 1 |
| 3 | 1 | 3 | 3 |
| 0 | 2 | 0 | 2 |
| 0 | 2 | 1 | 5 |
| 0 | 2 | 2 | 0 |
| 0 | 2 | 3 | 1 |
| 1 | 2 | 0 | 2 |
| 1 | 2 | 1 | 0 |
| 1 | 2 | 2 | 2 |
| 1 | 2 | 3 | 4 |
| 2 | 2 | 0 | 0 |
| 2 | 2 | 1 | 1 |
| 2 | 2 | 2 | 1 |
| 2 | 2 | 3 | 3 |
| 3 | 2 | 0 | 2 |
| 3 | 2 | 1 | 2 |
| 3 | 2 | 2 | 1 |
| 3 | 2 | 3 | 0 |
| 0 | 2 | 0 | 3 |
| 0 | 2 | 1 | 3 |
| 0 | 3 | 2 | 1 |
| 0 | 3 | 3 | 4 |
| 1 | 3 | 0 | 5 |
| 1 | 3 | 1 | 2 |
| 1 | 3 | 2 | 8 |
| 1 | 3 | 3 | 0 |
| 2 | 3 | 0 | 0 |
| 2 | 3 | 1 | 0 |
| 2 | 3 | 2 | 1 |
| 2 | 3 | 3 | 1 |
| 3 | 3 | 0 | 2 |
| 3 | 3 | 1 | 5 |
| 3 | 3 | 2 | 4 |
| 3 | 3 | 3 | 2 |

In Table I, the X values may range from zero to three, the Y values may range from zero to three, the Z values may range from zero to three, and the reflectivity data values may range from zero to nine. In a first example method, the reflectivity data values in two-dimensional representation 62 may correspond to a specific altitude such as Y equals zero, as shown in Table II. In a second example method, the reflectivity data values in two-dimensional representation 62 may correspond to the highest reflectivity data value for any altitude for each X and Z value, as shown in Table II.

TABLE II

Two examples of two-dimensional representation 62

| X | Z | First method: Y = zero | Second method: highest RDV at any altitude |
|---|---|---|---|
| 0 | 0 | 4 | 4 |
| 0 | 1 | 1 | 5 |
| 0 | 2 | 0 | 3 |
| 0 | 3 | 2 | 4 |
| 1 | 0 | 9 | 9 |
| 1 | 1 | 1 | 4 |
| 1 | 2 | 7 | 7 |
| 1 | 3 | 6 | 6 |
| 2 | 0 | 0 | 0 |
| 2 | 1 | 2 | 2 |
| 2 | 2 | 1 | 3 |
| 2 | 3 | 0 | 3 |
| 3 | 0 | 3 | 3 |
| 3 | 1 | 2 | 5 |
| 3 | 2 | 1 | 4 |
| 3 | 3 | 3 | 3 |

Figure 4:
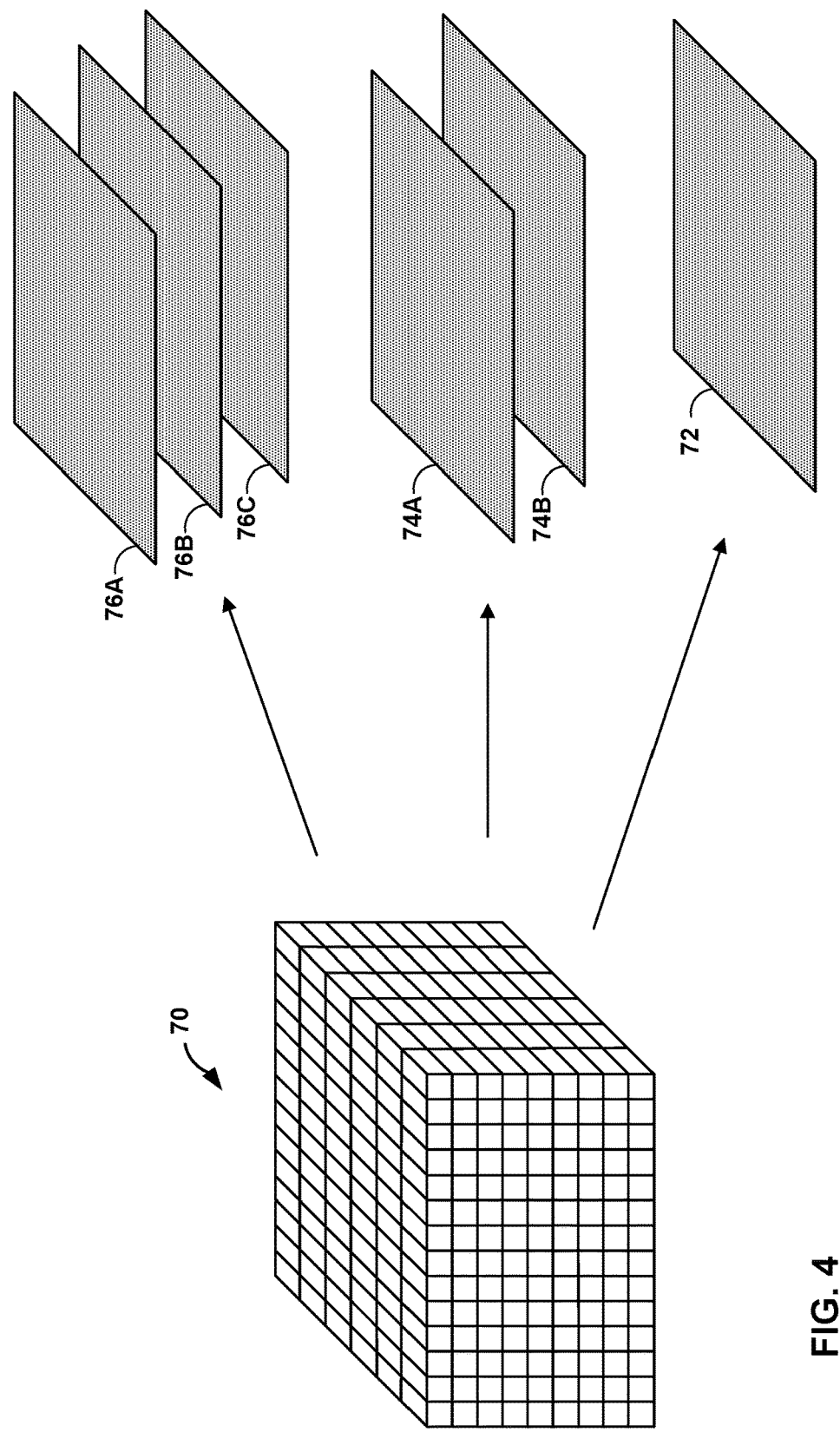
FIG. 4 is a conceptual block diagram depicting the conversion of a three-dimensional representation into one or more two-dimensional representations, in accordance with some examples of this disclosure.

FIG. 4 is a conceptual block diagram depicting the conversion of a three-dimensional representation 70 into one or more two-dimensional representations, in accordance with some examples of this disclosure. A processor implementing the techniques of this disclosure may generate one or more two-dimensional representations based on the magnitude or severity of the reflectivity data in three-dimensional representation 70. If the two-dimensional representations are horizontal layers, each two-dimensional representation may correspond to a specific altitude.

For example, a processor may generate two-dimensional representation 72 based on determining that the reflectivity data in three-dimensional representation 70 has a magnitude less than a first threshold value. The processor may generate two-dimensional representations 74A-74B based on determining that the reflectivity data in three-dimensional representation 70 has a magnitude more than the first threshold value but less than a second threshold value. The processor may generate two-dimensional representations 76A-76C based on determining that the reflectivity data in three-dimensional representation 70 has a magnitude more than the second threshold value. Thus, in good weather conditions, the processor may conserve resources by transmitting less data, and in bad weather conditions, the processor may provide better data accuracy by transmitting more data.

Figure 5:
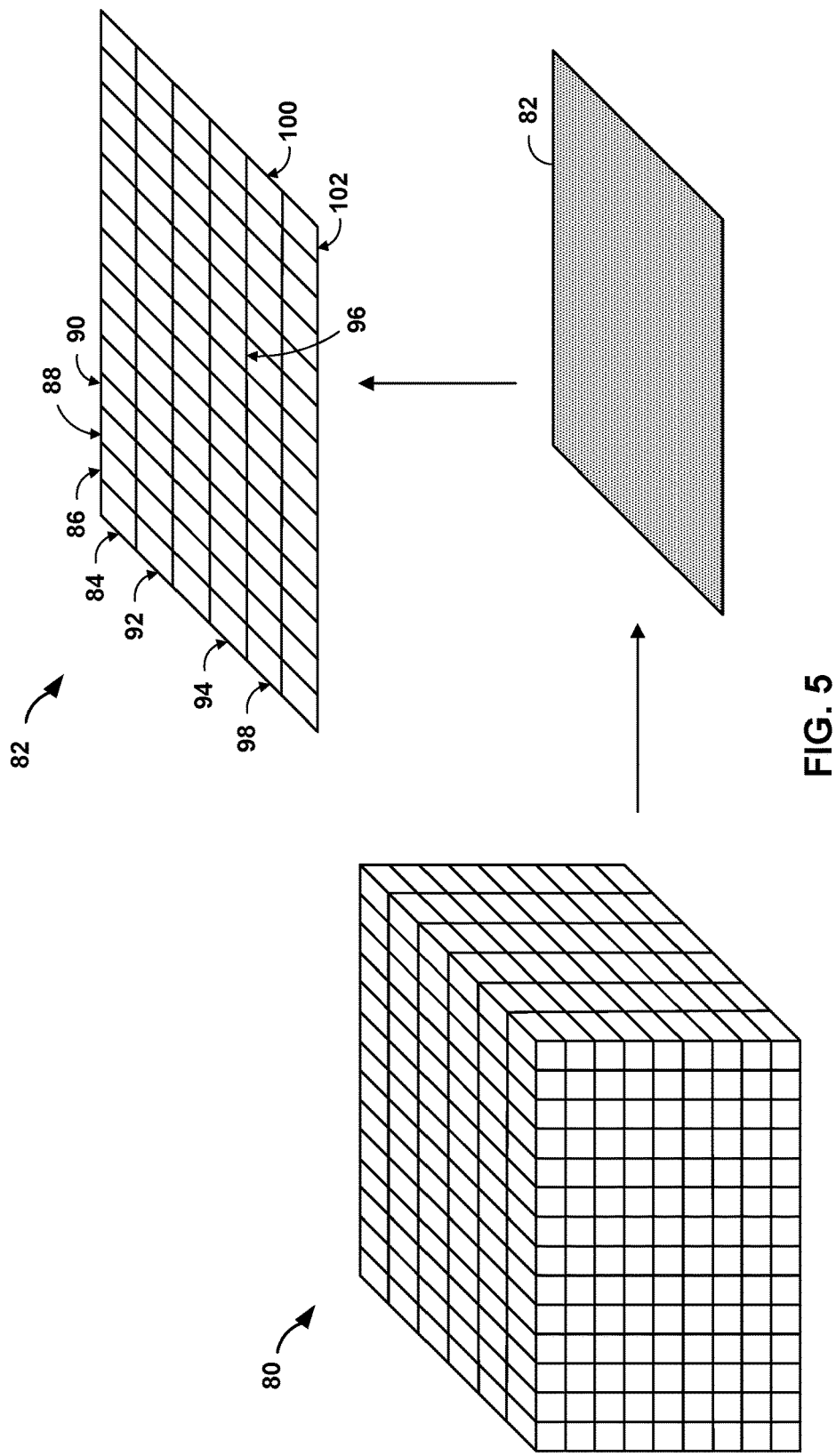
FIG. 5 is a conceptual block diagram depicting the conversion of a three-dimensional representation into a two-dimensional representation with a plurality of data points associated with zero or more orthogonal layer values, in accordance with some examples of this disclosure.

FIG. 5 is a conceptual block diagram depicting the conversion of a three-dimensional representation 80 into a two-dimensional representation 82 with a plurality of data points 84-102 associated with zero or more orthogonal layer values, in accordance with some examples of this disclosure. Two-dimensional representation 82 may comprise a horizontal layer, where each data point on two-dimensional representation 82 represents a latitude range and a longitude range. Two-dimensional representation 82 may also comprise a vertical layer, where each data point on two-dimensional representation 82 represents an altitude range and latitude range or a longitude range.

Two-dimensional representation 82 may comprise a plurality of data points. Each data point may comprise a location on two-dimensional representation 82. FIG. 5 depicts each of data points 84-102 as a four-sided box on two-dimensional representation 82, but each data point may be any suitable shape. If two-dimensional representation 82 is a horizontal layer, each data point may comprise a latitude range and a longitude range. For example, data points 84, 86, 88, 90 may have the same or similar latitude range but different longitude ranges. Data points 84, 92, 94, 98 may have the same or similar longitude ranges but different latitude ranges.

Two-dimensional representation 82 may comprise an index plane, where each data point of data points 84-102 may comprise zero or more orthogonal layer values indicating that a reflectivity data value in a respective orthogonal layer exceeds a threshold value. If two-dimensional representation 82 comprises a horizontal index plane, each orthogonal layer may comprise a vertical layer. For example, data point 100 may comprise orthogonal layer values that correspond to altitude ranges with reflectivity data values that are higher than a threshold value. Data point 100 in two-dimensional representation 82 may comprise an orthogonal layer value for ten thousand feet above sea level if the reflectivity data value at ten thousand feet above sea level exceeds a threshold value. Data point 100 may also comprise an orthogonal layer value for an altitude range, such as from ten thousand feet to eleven thousand feet, in which the reflectivity data exceeds the threshold value.

If the reflectivity data values at all altitudes for data point 100 are less than the threshold value, data point 100 may include zero orthogonal layer values. Accordingly, each data point in two-dimensional representation 82 may indicate which altitudes or altitude ranges have reflectivity data values that exceed the threshold value. Using the data in Table I as an example, two-dimensional representation 82 may comprise a horizontal index plane with orthogonal layer values as shown in Table III. In this example, the threshold reflectivity value may be three, such that altitudes with reflectivity data values of greater than three are listed as orthogonal layer values.

TABLE III

Two examples of two-dimensional representation 82

| X | Z | Orthogonal layer values for a threshold of three | Orthogonal layer values for a threshold of one |
|---|---|---|---|
| 0 | 0 | 0 | 0, 3 |
| 0 | 1 | 1, 2 | 1, 2, 3 |
| 0 | 2 |  | 1 |
| 0 | 3 | 3 | 0, 3 |
| 1 | 0 | 0, 3 | 0, 2, 3 |
| 1 | 1 | 1 | 1, 3 |
| 1 | 2 | 0, 3 | 0, 2, 3 |
| 1 | 3 | 0, 2 | 0, 1, 2 |
| 2 | 0 |  |  |
| 2 | 1 |  | 0 |
| 2 | 2 |  | 1 |
| 2 | 3 |  | 1, 2 |
| 3 | 0 |  | 0, 1, 2, 3 |
| 3 | 1 | 3 | 0, 2, 3 |
| 3 | 2 | 3 | 3 |
| 3 | 3 |  | 0, 1, 3 |

Figure 6:
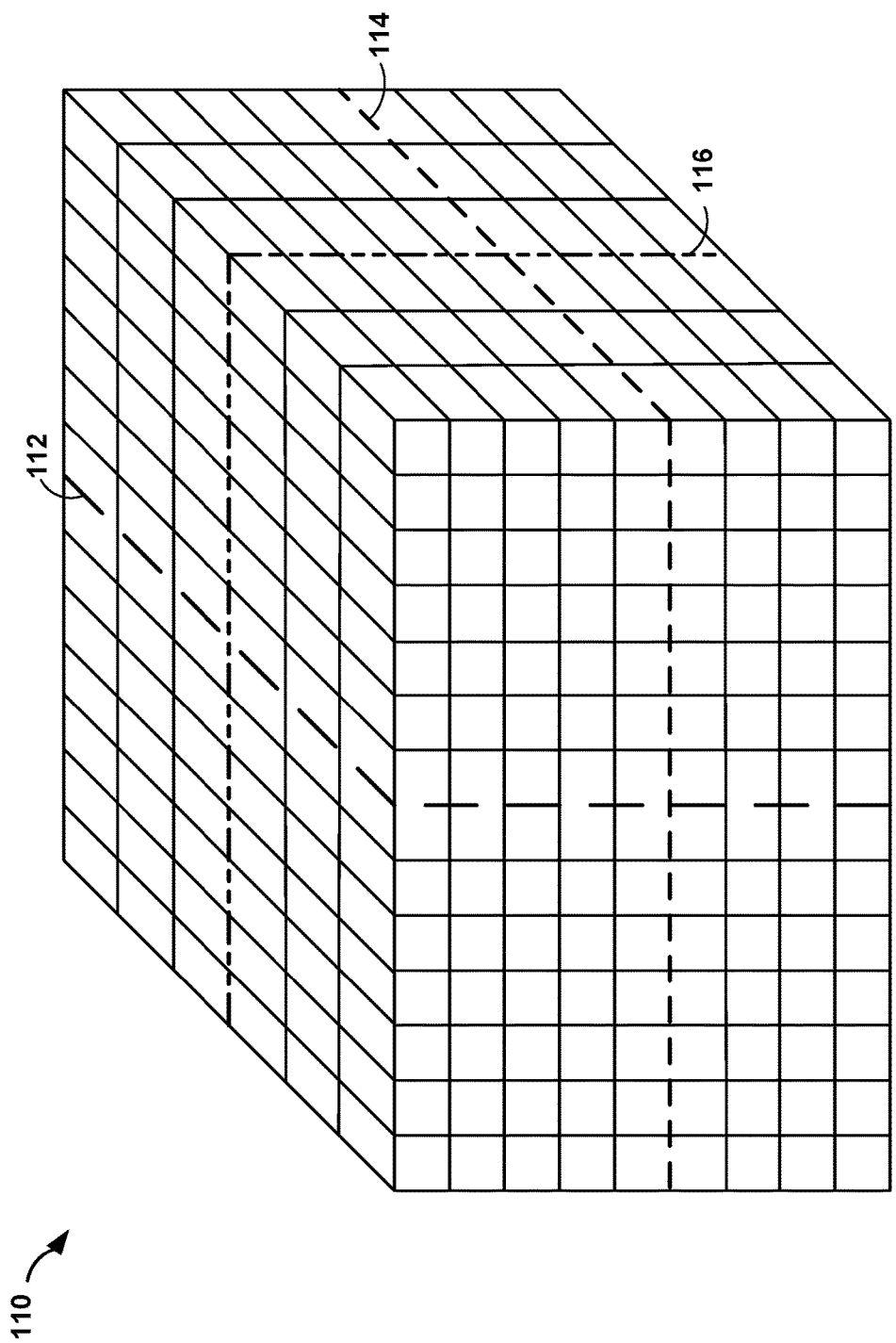
FIG. 6 is a conceptual block diagram depicting a three-dimensional representation with three two-dimensional representations, each with a plurality of data points associated with zero or more orthogonal layer values, in accordance with some examples of this disclosure.

FIG. 6 is a conceptual block diagram depicting a three-dimensional representation 110 with three two-dimensional representations 112, 114, 116, each with a plurality of data points associated with zero or more orthogonal layer values, in accordance with some examples of this disclosure. Two-dimensional representations 112, 114, 116 may comprise layers that are orthogonal to each other, such that two-dimensional representations 112, 116 may comprise vertical layers and two-dimensional representation 114 may be a horizontal layer. Each of two-dimensional representations 112, 114, 116 may comprise index planes with a plurality of data points, where each data point holds zero or more orthogonal layer values.

For two-dimensional representation 112, each data point may comprise a latitude range and an altitude range, and each orthogonal layer value may comprise a longitude or a longitude range. For two-dimensional representation 114, each data point may comprise a latitude range and a longitude range, and each orthogonal layer value may comprise an altitude or an altitude range. For two-dimensional representation 116, each data point may comprise a longitude range and an altitude range, and each orthogonal layer value may comprise a latitude or a latitude range. Table IV depicts three sets of orthogonal layer values (OLVs) for the data depicted in Table I, using a threshold reflectivity value of three.

TABLE IV

An example of two-dimensional representations 112, 114, 116

| Y | Z | OLVs for 2D rep 112 | X | Z | OLVs for 2D rep 114 | X | Y | OLVs for 2D rep 116 |
|---|---|---|---|---|---|---|---|---|
| 0 | 0 | 0, 1 | 0 | 0 | 0 | 0 | 0 | 0 |
| 0 | 1 |  | 0 | 1 | 1, 2 | 0 | 1 | 1 |
| 0 | 2 | 1 | 0 | 2 |  | 0 | 2 | 1 |
| 0 | 3 | 1 | 0 | 3 | 3 | 0 | 3 | 3 |
| 1 | 0 |  | 1 | 0 | 0, 3 | 1 | 0 | 0, 2, 3 |
| 1 | 1 | 0, 1 | 1 | 1 | 1 | 1 | 1 | 1 |
| 1 | 2 |  | 1 | 2 | 0, 3 | 1 | 2 | 3 |
| 1 | 3 |  | 1 | 3 | 0, 2 | 1 | 3 | 0, 2 |
| 2 | 0 |  | 2 | 0 |  | 2 | 0 |  |
| 2 | 1 | 0 | 2 | 1 |  | 2 | 1 |  |
| 2 | 2 |  | 2 | 2 |  | 2 | 2 |  |
| 2 | 3 | 1 | 2 | 3 |  | 2 | 3 |  |
| 3 | 0 | 1 | 3 | 0 |  | 3 | 0 |  |
| 3 | 1 | 3 | 3 | 1 | 3 | 3 | 1 |  |
| 3 | 2 | 1, 3 | 3 | 2 | 3 | 3 | 2 |  |
| 3 | 3 | 0 | 3 | 3 |  | 3 | 3 | 1, 2 |

Figure 7:
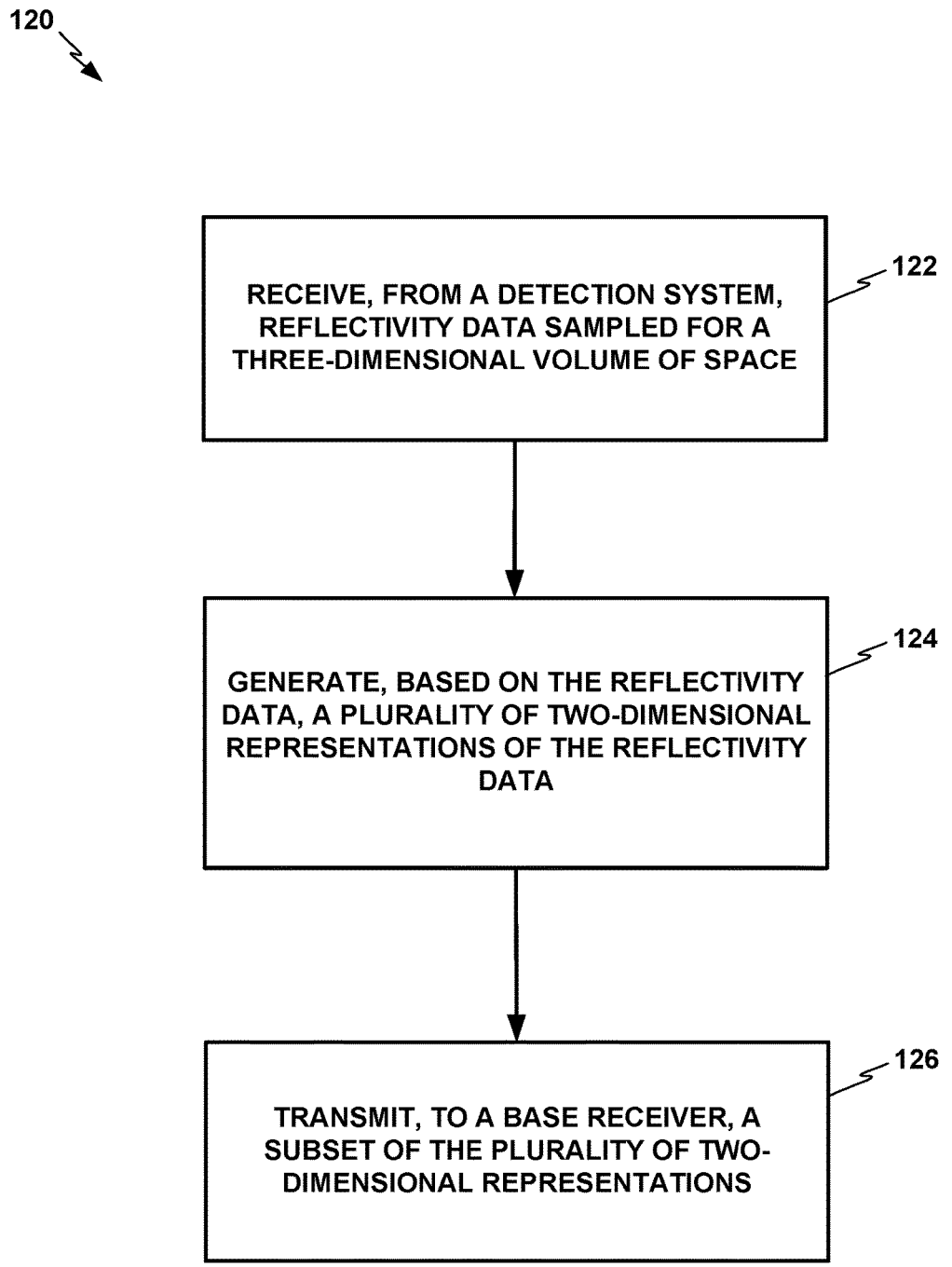
FIG. 7 shows a flowchart for an example technique for transmitting weather radar data, in accordance with some examples of this disclosure.

FIG. 7 shows a flowchart for an example technique 120 for transmitting weather radar data, in accordance with some examples of this disclosure. Technique 120 is described with reference to the system of FIG. 2, including processor 40, although other devices and systems may exemplify similar techniques.

The technique of FIG. 7 includes receiving, from detection system 50, reflectivity data sampled for a three-dimensional volume of space (122). Transmitter 54 may cause antenna 56 to send transmitted signal 32 to the three-dimensional volume of space. Receiver 58 may receive return signal 34 via antenna 56 and send reflectivity data to processor 40.

The technique of FIG. 7 further includes generating, based on the reflectivity data, a plurality of two-dimensional representations of the reflectivity data (124). Each two-dimensional representation may comprise a plurality of data points that represent a location in the three-dimensional volume of space. Each two-dimensional representation may be parallel or orthogonal to the other two-dimensional representations.

The technique of FIG. 7 further includes transmitting, to base receiver 36, a subset of the plurality of two-dimensional representations (126). The transmission of the plurality of two-dimensional representations may balance data accuracy and resource consumption.

The techniques of this disclosure may be implemented in a device or article of manufacture comprising a computer-readable storage medium. The term "processor," as used herein may refer to any of the foregoing structure or any other structure suitable for processing program code and/or data or otherwise implementing the techniques described herein. Elements of processor 40, user interface 42, transmission device 44, display device 48, and detection system 50 may be implemented in any of a variety of types of solid state circuit elements, such as CPUs, CPU cores, GPUs, digital signal processors (DSPs), application-specific integrated circuits (ASICs), a mixed-signal integrated circuits, field programmable gate arrays (FPGAs), microcontrollers, programmable logic controllers (PLCs), programmable logic device (PLDs), complex PLDs (CPLDs), a system on a chip (SoC), any subsection of any of the above, an interconnected or distributed combination of any of the above, or any other integrated or discrete logic circuitry, or any other type of component or one or more components capable of being configured in accordance with any of the examples disclosed herein.

Memory 46 of FIG. 2 is intended to collectively represent all memory of vehicle 30 and processor 40. One or more memory devices of memory 46 may include any volatile or non-volatile media, such as a RAM, ROM, non-volatile RAM (NVRAM), electrically erasable programmable ROM (EEPROM), flash memory, and the like. One or more memory devices of memory 46 may store computer readable instructions that, when executed by one or more processors of processor 40, cause the one or more processors of processor 40 to implement the techniques attributed herein to processor 40 and/or detection system 50.

Elements of processor 40 and/or detection system 50 may be programmed with various forms of software. Processor 40 and/or detection system 50 may be implemented at least in part as, or include, one or more executable applications, application modules, libraries, classes, methods, objects, routines, subroutines, firmware, and/or embedded code, for example. Elements of processor 40 and/or detection system 50 as in any of the examples herein may be implemented as a device, a system, an apparatus, and may embody or implement a method of comparing and de-conflicting weather data from multiple sources and generating weather data correction outputs, including for implementing example technique 120 as described with reference to FIG. 7. Processor 40 and/or detection system 50 may configure one or more processors of processor 40 to receive reflectivity data sampled for a three-dimensional volume of space; generate a plurality of two-dimensional representations of the reflectivity data; transmit to base receiver 36 a subset of the plurality of two-dimensional representations; and perform any other functions described herein.

The techniques of this disclosure may be implemented in a wide variety of computing devices. Any components, modules or units have been described to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

A "vehicle" may be an aircraft, a land vehicle such as an automobile, or a water vehicle such as a ship or a submarine. An "aircraft" as described and claimed herein may include any fixed-wing or rotary-wing aircraft, airship (e.g., dirigible or blimp buoyed by helium or other lighter-than-air gas), suborbital spaceplane, spacecraft, expendable or reusable launch vehicle or launch vehicle stage, or other type of flying device. An "aircraft" as described and claimed herein may include any crewed or uncrewed craft (e.g., uncrewed aerial vehicle (UAV), flying robot, or automated cargo or parcel delivery drone or other craft). "Weather information" may be considered to be a form of and included in "weather data" for purposes of this disclosure.

The following examples may illustrate one or more of the techniques of this disclosure.

Example 1

A method comprises receiving, in a vehicle and from a detection system, reflectivity data sampled for a three-dimensional volume of space. The method further comprises generating, based on the reflectivity data, a plurality of two-dimensional representations of the reflectivity data. The method further comprises transmitting, by a transmission device to a base receiver, a subset of the plurality of two-dimensional representations, wherein each two-dimensional representation of the subset of the plurality of two-dimensional representations comprises a plurality of data points.

Example 2

The method of example 1, further comprising associating a data point in a respective two-dimensional representation of the plurality of two-dimensional representations with one or more orthogonal layer values in response to determining a reflectivity data value in a respective orthogonal layer exceeds a threshold value.

Example 3

The method of example 1 or 2, wherein generating the plurality of two-dimensional representations of the reflectivity data comprises generating a single two-dimensional representation of the reflectivity data. Each data point of the plurality of data points comprises a location on the single two-dimensional representation and zero or more orthogonal layer values, wherein each orthogonal layer value of the zero or more orthogonal layer values indicates that the reflectivity data value in a respective orthogonal layer exceeds a threshold value.

Example 4

The method of any one of examples 1-3, wherein each location of each data point of the plurality of data points comprises a latitude range and a longitude range, and each respective orthogonal layer comprises an altitude range.

Example 5

The method of any one of examples 1-4, wherein generating the plurality of two-dimensional representations of the reflectivity data comprises generating three two-dimensional representations of the reflectivity data. Each two-dimensional representation of the three two-dimensional representations is orthogonal to two other two-dimensional representations of the three two-dimensional representations. Each data point of the plurality of data points comprises a location on the respective two-dimensional representation of the three two-dimensional representations and zero or more orthogonal layer values, wherein each orthogonal layer value of the zero or more orthogonal layer values indicates that the reflectivity data value in a respective orthogonal layer exceeds a threshold value.

Example 6

The method of any one of examples 1-5, further comprising selecting a number of the subset of the plurality of two-dimensional representations based on a magnitude of the reflectivity data.

Example 7

The method of any one of examples 1-6, wherein each two-dimensional representation of the plurality of two-dimensional representations comprises a latitude range, a longitude range, and reflectivity data for an altitude range within the volume of space.

Example 8

The method of any one of examples 1-7, wherein generating a two-dimensional representation comprises generating three two-dimensional representations of the reflectivity data, and each two-dimensional representation of the three two-dimensional representations is orthogonal to the other two two-dimensional representations of the three two-dimensional representations.

Example 9

A system comprises a detection system configured to receive reflectivity data sampled for a three-dimensional volume of space and a processor configured to receive the reflectivity data from the detection system and generate, based on the reflectivity data, a plurality of two-dimensional representations of the reflectivity data. The system further comprises a transmission device configured to transmit a subset of the plurality of two-dimensional representations to a base receiver, wherein each two-dimensional representation of the subset of the plurality of two-dimensional representations comprises a plurality of data points.

Example 10

The system of example 9, wherein the processor is further configured to associate a data point in a respective two-dimensional representation of the plurality of two-dimensional representations with one or more orthogonal layer values in response to determining a reflectivity data value in a respective orthogonal layer exceeds a threshold value.

Example 11

The system of example 9 or 10, wherein the processor is configured to generate the plurality of two-dimensional representations of the reflectivity data by at least generating a single two-dimensional representation of the reflectivity data. Each data point of the plurality of data points comprises a location on the single two-dimensional representation, and zero or more orthogonal layer values, wherein each orthogonal layer value of the zero or more orthogonal layer values indicates that the reflectivity data value in a respective orthogonal layer exceeds a threshold value.

Example 12

The system of example 9 or 11, wherein each location of each data point of the plurality of data points comprises a latitude range and a longitude range, and each respective orthogonal layer comprises an altitude range.

Example 13

The system of example 9 or 12, wherein the processor is configured to generate the plurality of two-dimensional representations of the reflectivity data by at least generating three two-dimensional representations of the reflectivity data. Each two-dimensional representation of the three two-dimensional representations is orthogonal to two other two-dimensional representations of the three two-dimensional representations. Each data point of the plurality of data points comprises a location on the respective two-dimensional representation of the three two-dimensional representations and zero or more orthogonal layer values, wherein each orthogonal layer value of the zero or more orthogonal layer values indicates that the reflectivity data value in a respective orthogonal layer exceeds a threshold value.

Example 14

The system of example 9 or 13, wherein the processor is further configured to select a number of the subset of the plurality of two-dimensional representations based on a magnitude of the reflectivity data.

Example 15

The system of example 9 or 14, wherein each two-dimensional representation of the plurality of two-dimensional representations comprises a latitude range, a longitude range, and reflectivity data for an altitude range within the volume of space.

Example 16

The system of example 9 or 15, wherein the processor is configured to generate a two-dimensional representation by at least generating three two-dimensional representations of the reflectivity data. Each two-dimensional representation of the three two-dimensional representations is orthogonal to the other two two-dimensional representations of the three two-dimensional representations.

Example 17

A device that includes a computer-readable medium having executable instructions stored thereon that is configured to be executable by one or more processors for causing the one or more processors to receive, in a vehicle and from a detection system, reflectivity data sampled for a three-dimensional volume of space, generate, based on the reflectivity data, a plurality of two-dimensional representations of the reflectivity data, and transmit, by a transmission device to a base receiver, a subset of the plurality of two-dimensional representations, wherein each two-dimensional representation of the subset of the plurality of two-dimensional representations comprises a plurality of data points.

Example 18

The device of claim 17, wherein the executable instructions further cause the one or more processors to one of the methods of examples 1-8.

Various examples have been described. These and other examples are within the scope of the following claims.

What is claimed is:

1. A method of processing weather data, the method comprising:
   receiving, in a vehicle and from a detection system, reflectivity data sampled for a three-dimensional volume of space;
   generating, based on the reflectivity data, a plurality of two-dimensional representations of the reflectivity data; and
   transmitting, by a transmission device to a base receiver, a subset of the plurality of two-dimensional representations, wherein each two-dimensional representation of the subset of the plurality of two-dimensional representations comprises a plurality of data points.

2. The method of claim 1, further comprising associating a data point in a respective two-dimensional representation of the plurality of two-dimensional representations with one or more orthogonal layer values in response to determining a reflectivity data value in a respective orthogonal layer exceeds a threshold value.

3. The method of claim 2, wherein:
   generating the plurality of two-dimensional representations of the reflectivity data comprises generating a single two-dimensional representation of the reflectivity data; and
   each data point of the plurality of data points comprises:
      a location on the single two-dimensional representation; and
      zero or more orthogonal layer values, wherein each orthogonal layer value of the zero or more orthogonal layer values indicates that the reflectivity data value in a respective orthogonal layer exceeds a threshold value.

4. The method of claim 3, wherein:
   each location of each data point of the plurality of data points comprises a latitude range and a longitude range; and
   each respective orthogonal layer comprises an altitude range.

5. The method of claim 2, wherein:
   generating the plurality of two-dimensional representations of the reflectivity data comprises generating three two-dimensional representations of the reflectivity data;
   each two-dimensional representation of the three two-dimensional representations is orthogonal to two other two-dimensional representations of the three two-dimensional representations; and
   each data point of the plurality of data points comprises:
      a location on the respective two-dimensional representation of the three two-dimensional representations; and
      zero or more orthogonal layer values, wherein each orthogonal layer value of the zero or more orthogonal layer values indicates that the reflectivity data value in a respective orthogonal layer exceeds a threshold value.

6. The method of claim 1, further comprising selecting a number of the subset of the plurality of two-dimensional representations based on a magnitude of the reflectivity data.

7. The method of claim 1, wherein each two-dimensional representation of the plurality of two-dimensional representations comprises:
   a latitude range;
   a longitude range; and
   reflectivity data for an altitude range within the volume of space.

8. The method of claim 1, wherein:
generating a two-dimensional representation comprises generating three two-dimensional representations of the reflectivity data; and
each two-dimensional representation of the three two-dimensional representations is orthogonal to the other two-dimensional representations of the three two-dimensional representations.

9. A system for processing weather data comprising:
a detection system configured to receive reflectivity data sampled for a three-dimensional volume of space; and
a processor configured to:
receive the reflectivity data from the detection system; and
generate, based on the reflectivity data, a plurality of two-dimensional representations of the reflectivity data; and
a transmission device configured to transmit a subset of the plurality of two-dimensional representations to a base receiver, wherein each two-dimensional representation of the subset of the plurality of two-dimensional representations comprises a plurality of data points.

10. The system of claim 9, wherein the processor is further configured to associate a data point in a respective two-dimensional representation of the plurality of two-dimensional representations with one or more orthogonal layer values in response to determining a reflectivity data value in a respective orthogonal layer exceeds a threshold value.

11. The system of claim 9, wherein:
the processor is configured to generate the plurality of two-dimensional representations of the reflectivity data by at least generating a single two-dimensional representation of the reflectivity data; and
each data point of the plurality of data points comprises:
a location on the single two-dimensional representation; and
zero or more orthogonal layer values, wherein each orthogonal layer value of the zero or more orthogonal layer values indicates that the reflectivity data value in a respective orthogonal layer exceeds a threshold value.

12. The system of claim 9, wherein:
each location of each data point of the plurality of data points comprises a latitude range and a longitude range; and
each respective orthogonal layer comprises an altitude range.

13. The system of claim 9, wherein:
the processor is configured to generate the plurality of two-dimensional representations of the reflectivity data by at least generating three two-dimensional representations of the reflectivity data;
each two-dimensional representation of the three two-dimensional representations is orthogonal to two other two-dimensional representations of the three two-dimensional representations; and
each data point of the plurality of data points comprises:
a location on the respective two-dimensional representation of the three two-dimensional representations; and
zero or more orthogonal layer values, wherein each orthogonal layer value of the zero or more orthogonal layer values indicates that the reflectivity data value in a respective orthogonal layer exceeds a threshold value.

14. The system of claim 9, wherein the processor is further configured to select a number of the subset of the plurality of two-dimensional representations based on a magnitude of the reflectivity data.

15. The system of claim 9, wherein each two-dimensional representation of the plurality of two-dimensional representations comprises:
a latitude range;
a longitude range; and
reflectivity data for an altitude range within the volume of space.

16. The system of claim 9, wherein:
the processor is configured to generate a two-dimensional representation by at least generating three two-dimensional representations of the reflectivity data; and
each two-dimensional representation of the three two-dimensional representations is orthogonal to the other two two-dimensional representations of the three two-dimensional representations.

17. A device comprising a non-transitory computer-readable medium having executable instructions stored thereon, configured to be executable by one or more processors for causing the one or more processors to:
receive, in a vehicle and from a detection system, reflectivity data sampled for a three-dimensional volume of space;
generate, based on the reflectivity data, a plurality of two-dimensional representations of the reflectivity data; and
transmit, by a transmission device to a base receiver, a subset of the plurality of two-dimensional representations, wherein each two-dimensional representation of the subset of the plurality of two-dimensional representations comprises a plurality of data points.

18. The device of claim 17, wherein the executable instructions further cause the one or more processors to associate a data point in a respective two-dimensional representation of the plurality of two-dimensional representations with one or more orthogonal layer values in response to determining a reflectivity data value in a respective orthogonal layer exceeds a threshold value.

19. The device of claim 18, wherein:
the executable instructions cause the one or more processors to generate the plurality of two-dimensional representations of the reflectivity data by at least generating a single two-dimensional representation of the reflectivity data; and
each data point of the plurality of data points comprises:
a location on the single two-dimensional representation; and
zero or more orthogonal layer values, wherein each orthogonal layer value of the zero or more orthogonal layer values indicates that the reflectivity data value in a respective orthogonal layer exceeds a threshold value.

20. The device of claim 18, wherein:
the executable instructions cause the one or more processors to generate the plurality of two-dimensional representations of the reflectivity data by at least generating three two-dimensional representations of the reflectivity data;
each two-dimensional representation of the three two-dimensional representations is orthogonal to two other two-dimensional representations of the three two-dimensional representations; and each data point of the plurality of data points comprises:
  a location on the respective two-dimensional representation of the three two-dimensional representations; and
  zero or more orthogonal layer values, wherein each orthogonal layer value of the zero or more orthogonal layer values indicates that the reflectivity data value in a respective orthogonal layer exceeds a threshold value.

* * * * *

UNITED STATES PATENT AND TRADEMARK OFFICE
CERTIFICATE OF CORRECTION

| | | |
|---|---|---|
| PATENT NO. | : 10,371,793 B2 | Page 1 of 1 |
| APPLICATION NO. | : 15/231473 | |
| DATED | : August 6, 2019 | |
| INVENTOR(S) | : Wang | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 342 days.

Signed and Sealed this
Second Day of June, 2020

Andrei Iancu
*Director of the United States Patent and Trademark Office*